United States Patent [19]
Benze

[11] Patent Number: 5,392,726
[45] Date of Patent: Feb. 28, 1995

[54] SAILBOAT

[76] Inventor: Theodore A. Benze, 431 Arch St., Carlisle, Pa. 17013

[21] Appl. No.: 97,666

[22] Filed: Jul. 27, 1993

Related U.S. Application Data

[63] Continuation-in-part of Ser. No. 881,158, May 11, 1992, Pat. No. 5,231,943.

[51] Int. Cl.⁶ .............................................. B63H 9/04
[52] U.S. Cl. ..................................... 114/39.1; 114/61; 114/90
[58] Field of Search ....................... 114/39.1, 39.2, 61, 114/89, 90, 102, 103, 104, 97, 123

[56] References Cited

U.S. PATENT DOCUMENTS

| | | |
|---|---|---|
| 24,090 | 5/1859 | Bell . |
| 163,940 | 6/1875 | Norcross . |
| 1,375,400 | 4/1921 | Ljungstrom . |
| 2,147,501 | 2/1939 | Ryder ................................ 114/102 |
| 2,724,356 | 11/1955 | Szakacs ................................ 114/39 |
| 2,893,339 | 7/1959 | Ram ................................ 114/39.1 |
| 3,150,632 | 9/1964 | Evans ................................ 114/123 |
| 3,173,395 | 3/1965 | Laurent ................................ 114/39.1 |
| 3,195,494 | 7/1965 | Robin ................................ 114/39.1 |
| 3,693,571 | 9/1972 | Hiscock ................................ 114/102 |
| 3,960,102 | 6/1976 | Davy ................................ 114/61 |
| 4,044,702 | 8/1977 | Jamieson ................................ 114/102 |
| 4,263,861 | 4/1981 | Vicard ................................ 114/39.1 |
| 4,449,468 | 5/1984 | Schulz et al. ................................ 114/97 |
| 4,494,472 | 1/1985 | Rougerie ................................ 114/61 |
| 4,603,648 | 8/1986 | Berge ................................ 114/39.1 |
| 4,723,498 | 2/1988 | Stampe ................................ 114/102 |
| 4,730,570 | 3/1988 | Harris ................................ 114/61 |
| 4,922,846 | 5/1990 | Biagioli ................................ 114/90 |
| 5,235,925 | 8/1993 | Farrier ................................ 114/123 |

Primary Examiner—Stephen P. Avila
Attorney, Agent, or Firm—Leonard Bloom

[57] ABSTRACT

A sailing craft having a center hull, a port hull and a starboard hull. The port and starboard hulls are adjustably connected to the center hull by bridge beams such that the port starboard hulls may be disposed adjacent to, or outward from, the center hull. An inverted U-shaped mast has legs angled outwardly and connected to the port and starboard hulls when the mast is erect and legs which are substantially parallel when the mast is stepped down for storage on the center hull. A primary boom is rotatably connected to the center hull and rotates through 360°. An articulating boom is pivotally connected to each of the ends of the primary boom. A sail shape boom is connected to the articulating booms by a trolley on each articulating boom. The head of a sail is connected to the top of the mast and the foot of the sail is connected to the sail shape boom. The sail and booms are rotatable through 360° without contacting the mast. Sail lines connected to the edges of the sail are separated into support lines which are disposed over the surfaces of the sail and connected to wishbone spars to maintain luff and each alignment and control the sail shape by equal tensioning applied by the halyard.

18 Claims, 11 Drawing Sheets

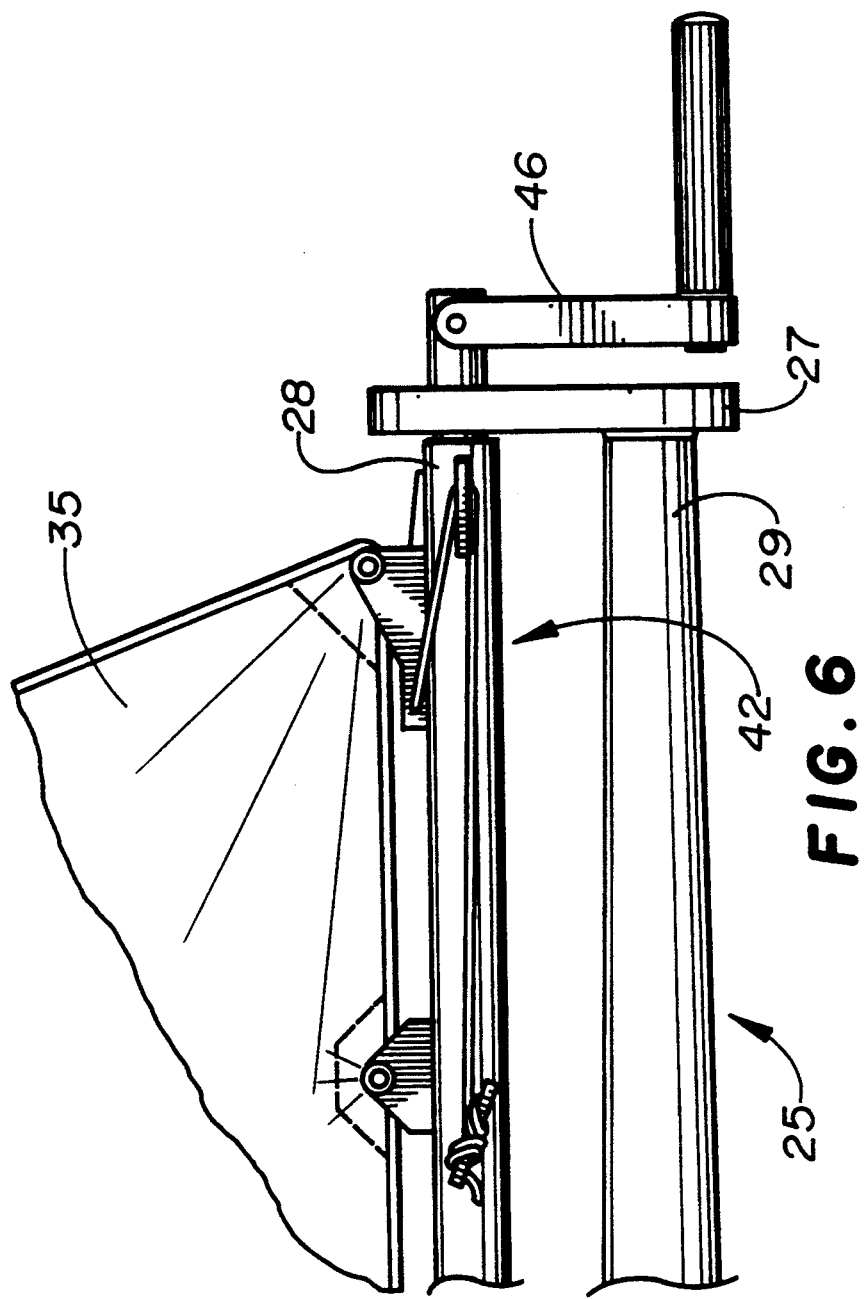

SAILBOAT

CROSS REFERENCE TO RELATED APPLICATION

This application is a continuation-in-part of application Ser. No. 881,158, filed on May 11, 1992, now U.S. Pat. No. 5,231,943, the disclosure of which is incorporated by reference herein in its entirety.

FIELD OF THE INVENTION

The present invention concerns a sail plan for a sailing craft such as a sailboat, and in particular for a sail craft having a triangular sail mounted on a boom and rotatable about a vertical axis through 360°.

BACKGROUND OF THE INVENTION

The art of sailing has been practiced for thousands of years and is generally well known throughout the world. Most sailing craft utilize one or more masts which project upwardly from the hull and have at least one sail attached thereto. In small boats which are operated by one person, the need to constantly adjust the setting of the sail with respect to the direction of the wind while controlling the rudder and handling the various lines associated with the boom and the sail, is a difficult and strenuous operation.

Various sails and mast configurations have been proposed and used to attempt to simplify the operation of sailing craft and/or to improve the efficiency of the sailing craft. The applicant is aware of the following which are considered pertinent to the present application.

| Inventor(s) | U.S. Pat. No. |
| --- | --- |
| Bell | 24,090 |
| Norcross | 163,940 |
| Ljungstrom | 1,375,400 |
| Ryder | 2,147,501 |
| Szakacs | 2,724,356 |
| Laurent | 3,173,395 |
| Robin | 3,195,494 |
| Hiscock | 3,693,571 |
| Jamieson | 4,044,702 |
| Berge | 4,603,648 |
| Stampe | 4,723,498 |
| Biagioli | 4,922,846 |

Bell discloses a shortened mast bench set at a greater than standard angle to the horizontal plane. A spar having upwardly curved ends is secured to the mast. The mast is connected to the mast bench. A single sail or separate sail may be fitted to the mast.

Norcross discloses a mast composed of two or more timbers which are joined at their tops by a common cap. The bottoms of the masts are mounted to a revolving platform which is received in a socket in the deck.

Ljungstrom discloses a mast which can be inclined together with the sail, either ahead or astern in the longitudinal direction of the boat. The lower end of the mast is attached to rollers running on a curved bar.

Ryder discloses a triangular sail which is rotatable 360° about a single center mast, mounted amidship. The mast is an assemblage of several parts.

Szakacs discloses a single curved mast mounted on the stern of the boat. A triangular sail is attached to the mast. The sail is framed by a strip of wood on the foot and by steel cables on the sides.

Laurent discloses a triangular sail mounted to a center mast of a catamaran and rotatable 360° about the mast. The mast is supported by shrouds which are mounted fore and aft. The rudders and the sail are controlled from the center of the boat.

Robin discloses a sail control for vessels wherein a sail rig includes a flexible sail membrane, drawn taut within a triangular, peripheral frame by means of cables and operated by winches. The sail may rotate through 360°. The frame is connected to the hull and is slidably mounted on guide rails. The frame may also pivot about a base.

Hiscock discloses a sail rig for many types of vessels including a monohull, a catamaran, a trimaran, a hydrofoil, an ice boat, and a land yacht. The sail is symmetrical and is a spherical isosceles triangle with a curved leach, a curved luff, and a curved foot. A boom is provided to swing freely about the lower end of the luff spar, and a sail is mounted with its foot adjacent to the boom and its luff adjacent to the luff spar.

Jamieson discloses a single sail suspended at its head from the apex of a tripod mast. The foot of the sail is attached to a spar. The spar is rotatably mounted atop a stub mast which is centrally located with respect to the tripod mast.

Berge discloses a catamaran type sailboat with several inclined mast-like elements which have a common upper connection. The masts are pivotable at their lower ends.

Stampe discloses two masts with a common thwartships plane which are joined at a mast head. Each mast is provided with a respective main boom and two main sails.

Biagioli discloses a masting which comprises three (3) poles to form a pyramid with a triangular base and connected upper ends at the vertex. The masting also comprises a plurality of stays to which sails are applied. The boat may be a catamaran.

Thus, despite interest in sails over a period of many years, there still exists a need for a simple system for a sail which enables a sailing craft to be operated by one individual with a minimum of effort and which provides increased maneuverability to the sailing craft.

Further, the simplified sail permits the design of the sailing craft to be simplified and improved so that the sailing craft can be more easily handled under various conditions of wind.

SUMMARY OF THE INVENTION

A principal object of the invention is to provide a plan for a sail on a sailing craft which provides increased maneuverability to the sailing craft.

It is another object of the present invention to provide a plan for a sail on a sailing craft, wherein the lower edge of a sail is connected to a boom, the boom being pivotable about a midpoint wherein pressure on the edges of the sides of the sail can be equalized.

It is a further object of the present invention to provide a sailing craft having separate port and starboard hulls which are movable and on which a U-shaped mast may be connected.

It is still another object of the present invention to provide a sailing craft having a U-shaped mast which has legs which control the attitude of the port and starboard hulls with respect to the center hull when the mast is erected and in which the mast may be stepped down to have parallel legs when the mast is stored on the center hull.

In accordance with the teachings of the present invention, there is disclosed a sailing craft having a center hull. The hull has a deck, a port side, a starboard side, a bow and a stern in a longitudinal plane, and an amidships between the bow and the stern. The craft includes an outboard port hull and an outboard starboard hull. The separate hulls are adjustably connected to the center hull by respective port and starboard bridge beams. The outboard hulls may be moved and secured adjacent to the center hull for storage, transport and power sailing with an outboard motor, wherein the hulls are in a substantially vertical and seaworthy position. The outboard hulls may be moved and secured outwardly from the center hull for sailing. An inverted substantially U-shaped mast has a port leg and a starboard leg. The legs have an angular juncture at an arcuate top. When the port hull and the starboard hull are disposed outwardly for sailing, the port leg is connected to the port hull and the starboard leg is connected to the starboard hull. A primary boom has a first end, an opposite second end and a midpoint. The midpoint of the primary boom is rotatably mounted approximately above the amidships of the center hull and between the port leg and the starboard leg of the mast. In this manner, the primary boom may rotate through 360° about a rotary axis in a plane parallel to the longitudinal plane of the center hull. A pair of secondary articulating booms are provided, one pivotally connected to the first end of the primary boom and the other pivotally connected to the second end of the primary boom. A sail shape boom has a first end and an opposite second end. The first end of the sail shape boom is slidably connected to the one articulating boom and the second end of the sail shape boom is slidably connected to the other articulating boom. The sail shape boom is disposed in a longitudinal plane above the longitudinal plane of the primary boom, whereby when the primary boom rotates through 360°, the sail shape boom also rotates through 360°. The ends of the sail shape boom avoid contact with the mast. A sail has at least two edges, a head, a center portion and a foot. The sail is symmetrical about a vertical axis. The head of the sail is releasably attached to the top of the mast. The foot of the sail is connected to the sail shape boom. Two wishbone Spars are connected about the sail, a lower wishbone spar being disposed in approximately the center portion of the sail and an upper wishbone spar being disposed near the head of the sail. The wishbone spars and the edges of the side avoid contact with the mast. A hem is formed on each edge of the sail. A respective sail line is enclosed within each hem, each respective sail line being attached near the head of the sail and extending downwardly within each hem to near the foot of the sail. Each respective sail line exits from the respective hem and forms two separate support lines. Each respective support line passes through a respective pulley, two pulleys being attached to the first end of the sail shape boom and two pulleys being attached to the second end of the sail shape boom. Each support line is angled upwardly and inwardly over the sail and is slidably connected to the lower wishbone spar. Each support line further is angled upwardly and outwardly and is connected to the upper wishbone spar. Thus, the respective sail lines and support lines reduce twisting and produce even tension throughout the sail. A cam has a base mounted on the hull deck, the cam being above the midpoint of the primary boom, and the primary boom rotating around the cam. A first line is connected from the cam to the one articulating boom. A second line is connected from the cam to the other articulating boom. When the primary boom rotates in a first direction, the first line is tightened and the second line is slackened such that the one articulating boom pivots. When the articulating boom rotates in a second opposite direction, the second line is tightened and the first line is slackened such that the second articulating boom pivots. In this manner, the luff and leach of the sail are interchangeable when the primary boom rotates through 180° and the sailing craft passes through the wind without stalling the sailing craft by backloading the sail.

These and other objects of the present invention will become apparent from a reading of the following specification, taken in conjunction with the .enclosed drawings.

BRIEF DESCRIPTION OF THE DRAWINGS

FIG. 6 is a side view showing outhauling of the corner of the sail.

DESCRIPTION OF THE PREFERRED EMBODIMENTS

Figure 1:
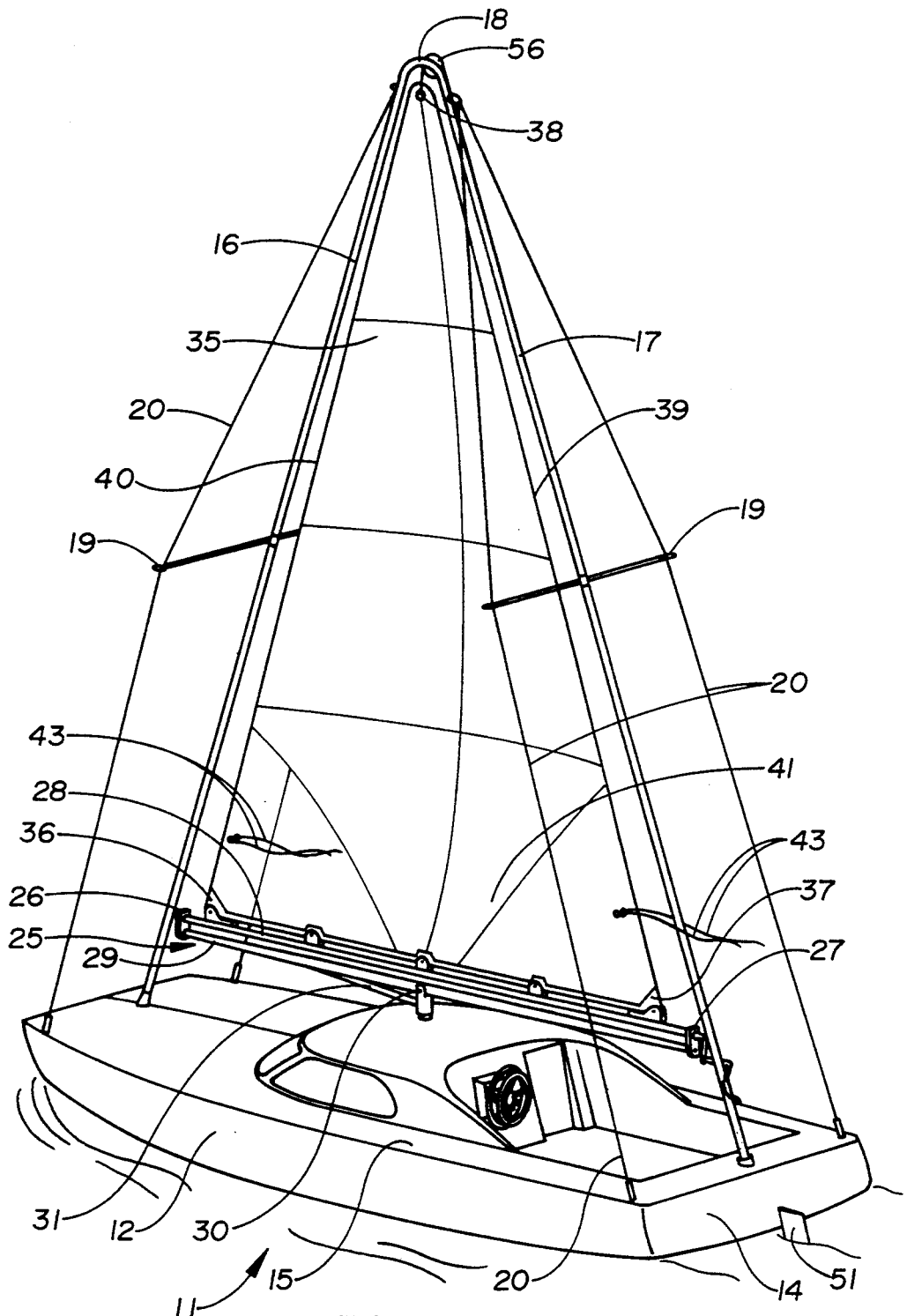
FIG. 1 is a perspective view of a sailboat having the sail plan of the present invention.

Referring now to the FIGS. 1-6, the sailboat 11 has a hull 12 which has a bow 13 and a stern 14 in the longitudinal plane of the hull 12 and an amidships 15 between the bow 13 and the stern 14. A forward mast 16 is mounted near the bow 13 of the hull 12, and an aft mast 17 is mounted near the stern 14 of the hull 12. Both masts 16, 17 are mounted in a manner so that the tops of the masts are angled inwardly, and the respective tops 18 of the masts 16, 17 are joined at a juncture at a point above the hull 12. Preferably, each mast 16, 17 further has a cross member 19 attached thereto between the hull 12 and the top 18. The cross member 19 is substantially perpendicular to the respective mast 16, 17 and the ends extend outwardly from each mast 16, 17 toward the port and starboard sides such that the cross members 19 are substantially parallel to the plane of the hull 12. To support the masts 16, 17, stays 20 are connected to each mast. One end of each stay 20 is connected to the top 18 of the respective mast 16, 17, and the intermediate section of the stay 20 is attached to the end of the respective cross member 19. The other opposite ends of the respective stays 20 are connected to the hull 12 at the port and starboard edges of the hull 12 adjacent to the mounting of the respective forward and aft masts 16, 17. In this manner, the masts 16, 17 are securely supported to the hull 12.

Figure 2:
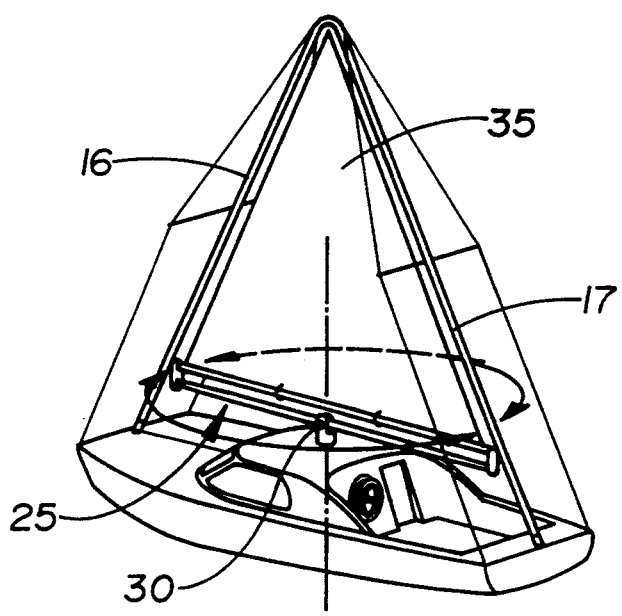
FIG. 2 is a perspective view of a sailboat showing 360° rotation of the sail of the present invention.
Figure 4:
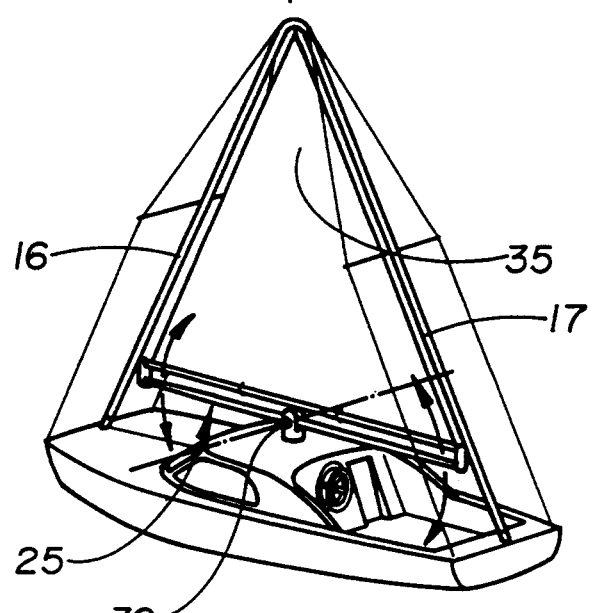
FIG. 4 is a perspective view of a sailboat showing pivotal mounting of the boom of the present invention.
Figure 3:
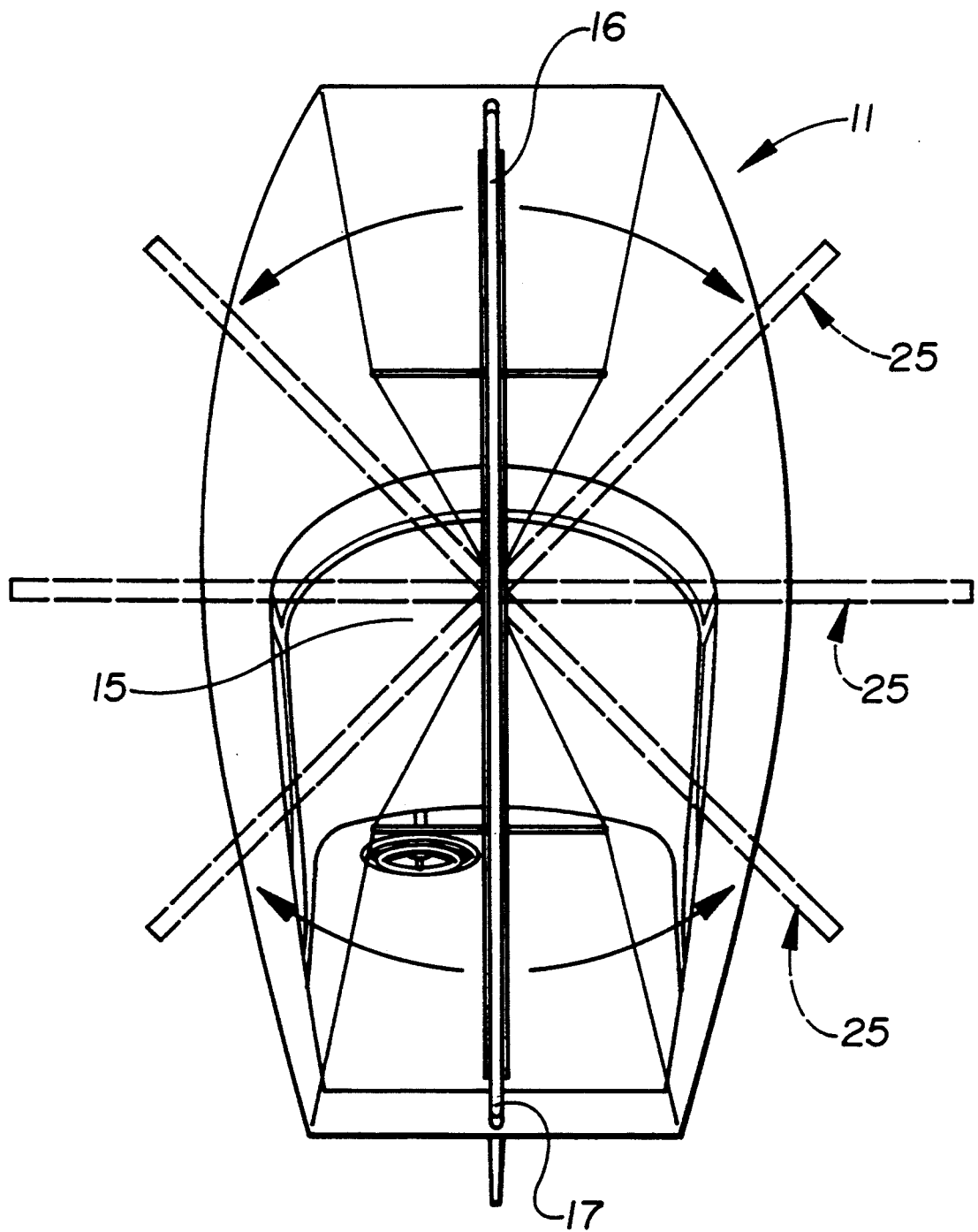
FIG. 3 is a top plan view showing 360° rotation of the sail having the rotational positions in phantom lines.
Figure 7:
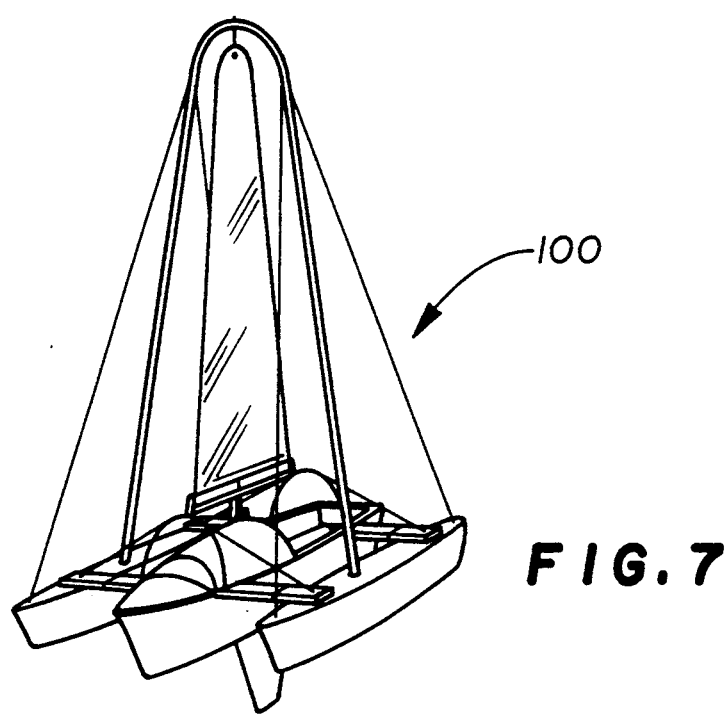
FIG. 7 is a perspective view of a tri-hulled sailing craft of the present invention.

A boom 25 having a first end 26 and a second end 27 is mounted approximately amidships 15 of the hull 12. The mounting is also approximately at the midpoint between the port and starboard sides of the hull 12. The midpoint of the boom 25 is rotatably mounted on the hull 12 in a manner whereby the boom 25 may rotate about a vertical axis through 360° in a plane parallel to the plane of the hull. The length of the boom 25 is less than the distance between the masts 16, 17 in the plane of rotation such that the ends 26, 27 of the boom 25 avoid contact with the masts 16, 17 (FIGS. 2, 3). In a preferred embodiment, the boom 25 is formed of an upper member 28 and a lower member 29 which are connected at the ends thereof so that the ends of the respective members 28, 29 are also the ends 26, 27 of the boom 25. The midpoint of the boom 25 is further pivotally mounted at the point 30 at which the boom 25 is rotatably mounted. In this manner, the boom 25 may also pivot above and below a plane parallel to the plane of the hull 12 throughout the entire 360° rotation of the boom 25 (FIG. 4).

A boom vang 31 may be connected between the boom 25 and the axle 47. The boom vang 31 is an adjustable connector which may be tightened or loosened. The boom vang 31 limits the movement of the boom 25 and the sail 35 attached thereto in both the rotational and the pivotal modes. The boom vang permits the shape of the sail 35 to be controlled since, when secured in a desired position by the boom vang 31, the amount of air being spilled from the sail 35 can be controlled.

Figure 5:
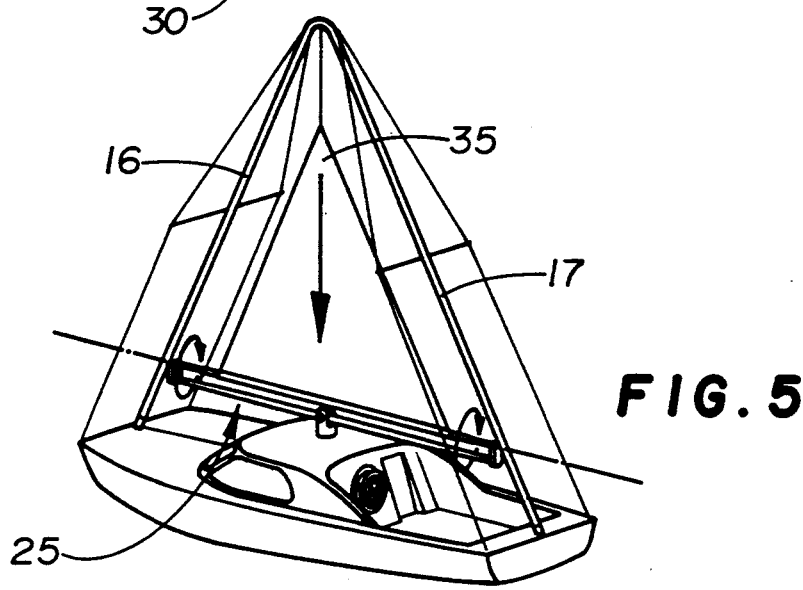
FIG. 5 is a perspective view of a sailboat showing lowering of the sail of the present invention.

A triangular sail 35 having a first corner 36, a second corner 37, a third corner 38, and side edges 39, 40 is mounted on the boom. The sail 35 is made of fabric, polyester, or similar material commonly used on sail boats or wind-powered vehicles. The foot 41 of the sail 35 is the side of the sail 35 which is between the first corner 36 and the second corner 37 and is disposed adjacent to the length of the boom 25. The third corner 38 of the sail 35 is movably mounted to the juncture at the top 18 of the masts 16, 17 in a manner whereby the third corner 38 of the sail 35 can be raised and/or lowered (FIG. 5). The first and second corners 36, 37 of the sail 35 are movable laterally and are connected to the respective first end 26 and second end 27 of the boom 25 by outhauls 42 as are known to persons skilled in the art (FIG. 6). Preferably, the corners 36, 37 of the sail 35 are attached to outhauls 42 on the upper member 28 of the boom 25. The lateral movement of the corners of the sail 25 permits the sailor to set the bag of the sail 25 by having a greater or lesser cup in the sail.

A pulley means is preferably mounted at the top 18 of the mast 12 and a halyard 45 is passed through the pulley. One end of the halyard 45 is connected to the third corner 38 of the sail and the halyard 45 is disposed along the mast, preferably the aft mast 17. The opposite end of the halyard 45 is releasably wrapped about a cleat or the like, preferably mounted on the mast 17 near the hull 12 so that the sailor may rapidly and easily be able to raise and/or lower the sail 35 by pulling or releasing the halyard 45.

In another embodiment (FIGS. 7-19), the sail plan may be used on a sailing craft 100 having a center hull 101, an outboard port hull 102 and an outboard starboard hull 103. The port hull 102 and the starboard hull 103 are adjustably connected to the center hull 101 by respective port and starboard bridge beams 104, 105 as will be described. Each hull 101, 102, 103 has a respective top surface (deck) and a respective keel with a respective vertical plane therebetween. The port hull 102 and the starboard hull 103 may be moved and secured to a position adjacent to the center hull 101 for storage. In this configuration, the sailing craft 100 may be mounted on a trailer for transport. In this disposition, the three hulls 101, 102, 103 are in a substantially vertical position and the vertical planes are substantially parallel (as shown in the broken lines in FIG. 8). The hulls 101, 102, 103 are in a seaworthy position and, when placed in the water, the keels are in the water and the decks are above the water. The port hull 102 and the starboard hull 103 may be moved outwardly from the center hull 101 and secured in an outward position for sailing.

Figure 8:
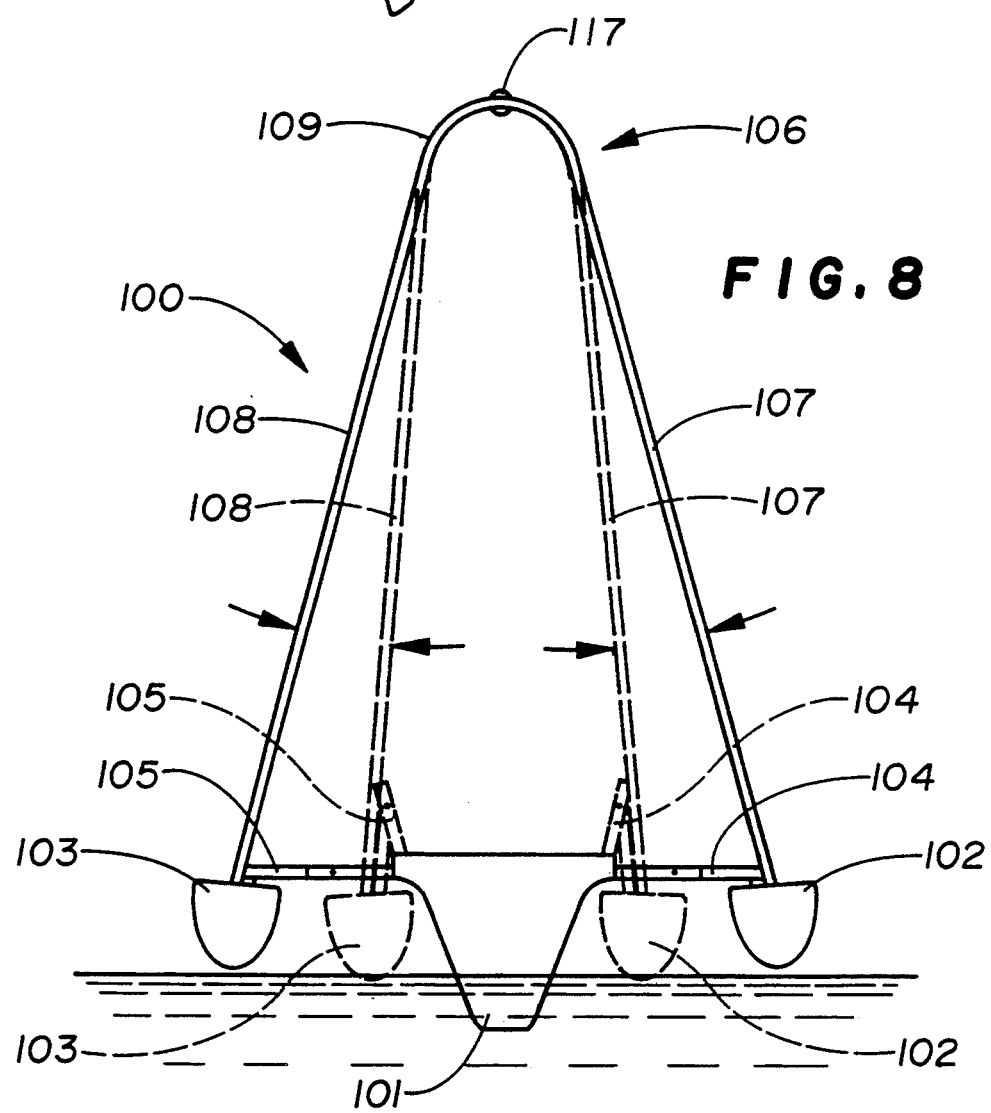
FIG. 8 is a front plan view of the invention of FIG. 7 showing the outboard hulls extended outwardly and, in broken lines, showing the outboard hulls moved inwardly adjacent to the center hull.

An inverted U-shaped mast 106 has a port leg 107 and a starboard leg 108 connected at an arcuate top 109. Preferably, the legs 107, 108 are separate members joined at the arcuate top 109 in a manner such that the ends 110, 111 of the legs 107, 108 are parallel to one another and may be moved radially apart from one another. The U-shape mast 106 is stored on the deck 112 of the center hull 101 in the longitudinal plane which extends from the bow 113 to the stern 114 of the center hull 101. Securing means such as a bracket are located on the port side 115 and the starboard side 116 of the center hull 101, at approximately amidships between the bow 113 and the stern 114, to retain the mast 106 on the center hull 101 during transport of the sailing craft 100. When the sailing craft 100 is prepared for sailing, the U-shaped mast 106 is removed from the storage position and stepped up to an upright position. The end 110 of the port leg 107 is removably connected to a fitting on the port hull 102 and the end 111 of the starboard leg 108 is removably connected to a fitting on the starboard hull 103. The connection may be a bracket on the respective hull with a threaded bolt through the bracket and through an opening in the respective leg 107, 108 of the mast 106 secured by nut cooperating with the threaded bolt. Other removable connectors may be used. In this manner, the mast 106 is supported approximately amidships of the sailing craft 100, the mast 106 extending from port to starboard and not being in contact with the center hull 101. If desired, a stay may be connected from the ends of the mast 106 to the top 109 of the mast 106 for additional support. The port hull 102 and the starboard hull 103 are disposed outwardly from the center hull 101 as will be described. The legs 107, 108 of the mast 106 form an acute angle so that the vertical planes of the port hull 106 and the starboard hull 107 are each disposed at an acute angle with respect to the vertical plane of the center hull 101. In this manner, as the sailing craft 100 heels to port, the plane of the port hull 106 is oriented vertically (plumb) with respect to the surface of the water and the starboard hull 107 is elevated above the water. Similarly, if the sailing craft 100 heels to starboard, the starboard hull 107 is oriented vertically (plumb) with respect to the surface of the water and the port hull 108 is elevated above the water (FIG. 8).

The top of the mast 109 may have a float means 117 attached which may be a foam material, an air inflatable container or other means which prevents the top of the mast 109 from sinking in the water. Thus, if the sailing craft 100 were to capsize for any reason, the float means would maintain the top of the mast 109 at the surface of the water and prevent the sailing craft from being completely inverted (turning turtle).

Figure 9:
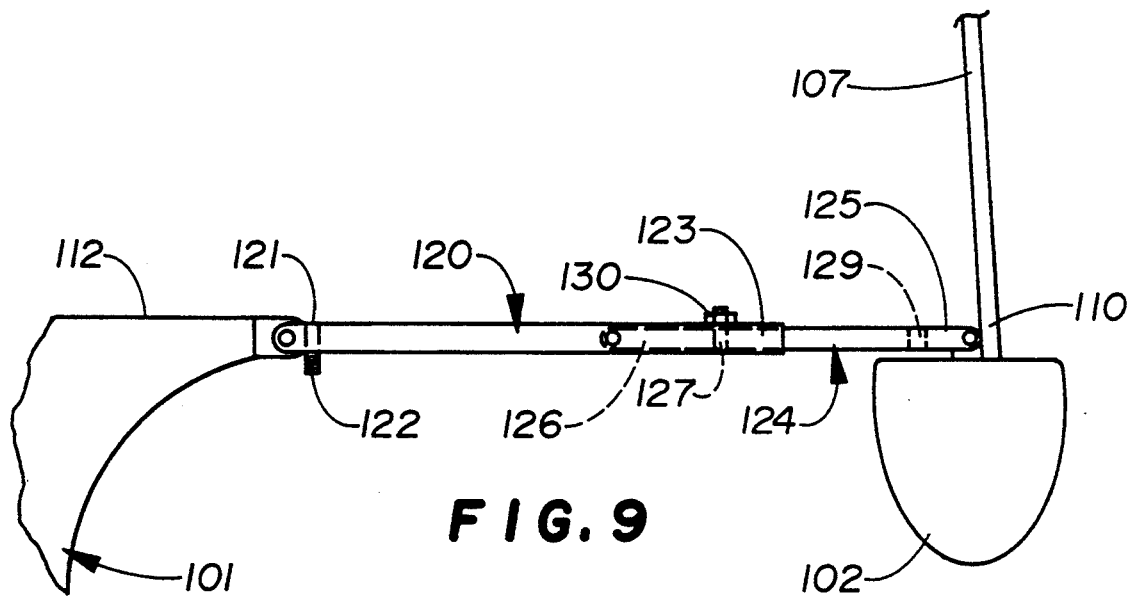
FIG. 9 is a front plan view of the port bridge beam in its extended position. The starboard bridge beam is not shown but is the mirror image of the port bridge beam.
Figure 10:
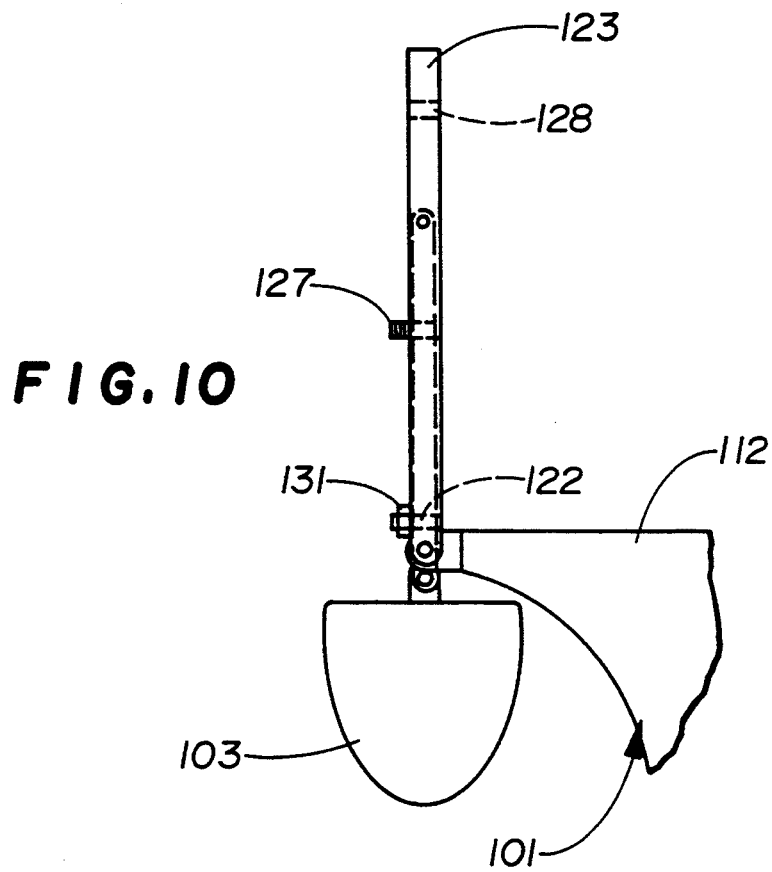
FIG. 10 is a front plan of the starboard bridge beam in its folded position. The port bridge beam is not shown but is the mirror image of the starboard bridge beam.
Figure 11:
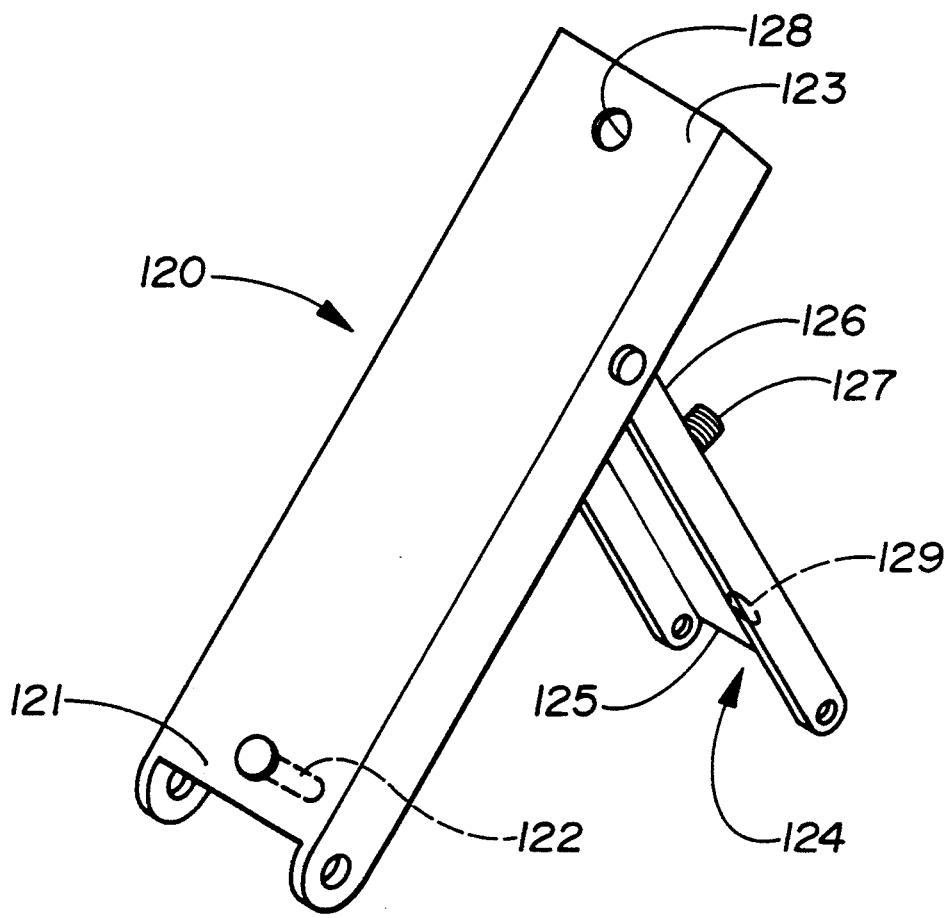
FIG. 11 is a perspective view of the bridge beam in a partially folded position.

As seen in FIGS. 9–11, the bridge beams 104, 105 each have a first arm 120 which each have an inboard end 121. The inboard end 121 of each bridge beam 104, 105 is hingedly connected to the center hull 101 respectively on the port and starboard sides 115, 116. A first threaded bolt 122 is perpendicularly connected near the inboard ends 121 of the respective first arms 120. Each threaded bolt 122 is oriented outwardly from the center hull 101 when the respective first arm 120 is hingedly moved to an upright position with respect to the center hull 101. The first arm 120 also has an opposite outboard end 123. The bridge beams 104, 105 further each have a respective second arm 124 each having a first outboard end 125. The outboard end 125 of each bridge beam 104, 105 is hingedly connected to the port hull 102 and the starboard hull 103 respectively. The second arms 124 are shorter in length than the first arms 120. The inboard ends 126 of the respective second arms 124 are hingedly connected to approximately the midpoint of the respective first arms 120. A second threaded bolt 127 is perpendicularly connected near the outboard end 125 of each second arm 124. The second threaded bolts 127 are oriented upwardly and outwardly from the respective port and starboard hulls 102, 103. A first opening 128 is formed near the outboard end 123 of each first arm 120, and a second opening 129 is formed near the outboard end 125 of each second arm 124. When the port hull 102 and the starboard hull 103 are moved outwardly from the center hull 101, the first arm 120 of each bridge beam 104, 105 is disposed in the longitudinal plane of the center hull 101 and is substantially perpendicular to the center hull 101. The second threaded bolt 127 on the second arm 124 is received in the first opening 128 near the outboard arm 123 of the first arm 120 and the second threaded bolt 127 near the inboard end 121 of the first arm 120 is oriented downwardly toward the keel of the center hull 101. A first cooperating threaded means 130 (such as a nut or a wing nut) is removably connected to the second threaded bolt 127 to secure the first arm 120 to the respective outboard hull 102, 103 in a seaworthy position.

The first threaded means 130 may be removed from the second threaded bolt 127 and the respective outboard hulls 102, 103 may be moved adjacent to the center hull 101 for storage or transport. The inboard end 121 of the first arm 120 hingably folds upright to a position approximately perpendicular with respect to the longitudinal plane of the center hull 101 with the outboard end 123 of the first arm 120 extending upwardly from the deck 112 of the center hull 101. The inboard end 126 and the outboard end 125 of the second arm 124 hingably folds so that the second arm 124 is moved to a position substantially parallel to the first arm 120. In this manner, the first threaded bolt 122 near the inboard end 121 of the first arm 120 is received in the second opening 129 in the outboard end 125 of the second arm 124. A second cooperating threaded means 131 (such as a nut or wing nut) is removably connected to the first threaded bolt 122 to secure the respective outboard hull 102, 103 adjacent to the center hull 101. If desired, the first cooperating threaded means 130 may be interchangeable with the second cooperating threaded means 131 and one means may be used with both threaded bolts. A threaded means is preferred but other connecting means known to persons skilled in the art may be used.

It is preferred that four (4) bridge beams be provided, two on the starboard side (fore and aft) and two on the port side (fore and aft) to provide increased stability and strength to the sailing craft 100. It is also preferred that the forward bridge beams be diametrically opposed to one another and that the aft bridge beams be diametrically opposed to one another.

It is preferred that the first arms 120 be formed of U-shaped channels for increased strength and rigidity. It is further preferred that the second arms 124 also be formed of U-shaped channels which are narrower than the channels of the first arms 120 so that the second arms 124 may be received in the channel of the first arm 120.

Figure 12:
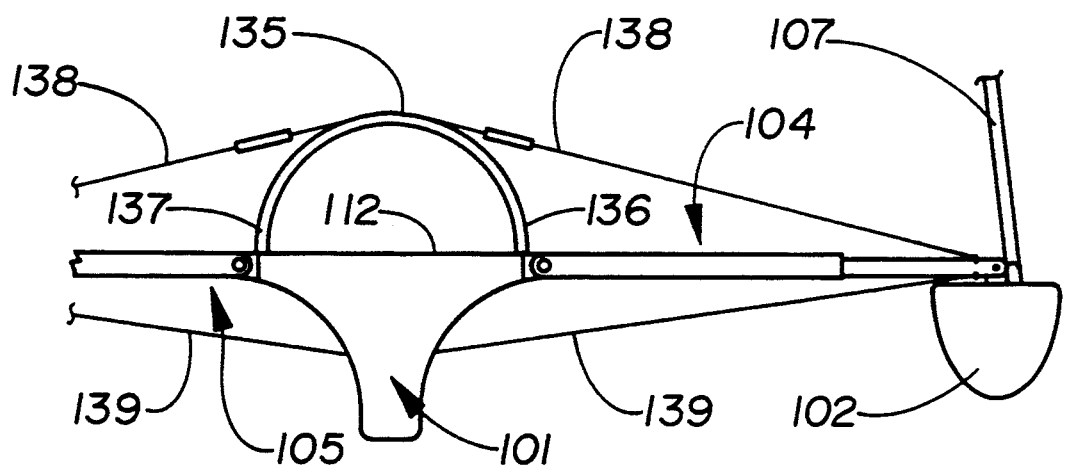
FIG. 12 is a front plan view showing the arched member on the center hull, the extended bridge beam connecting the port hull in its outboard position and cable bracings between the arched member and the bridge beam. The connection to the starboard hull (not shown) is the mirror image hereof.

Two arched members 135 are provided, each having a port end 136 and a starboard end which are connected to the deck 112 on the respective port side 115 and starboard side 115 of the center hull 101 (FIG. 12). One arched member 135 is mounted forwardly adjacent to forward bridge beams 104, 105 and the other arched member 135 is mounted aft adjacent to the aft bridge beams 104, 105. Upper cable bracings 138 are connected from the arched member 135 to the bridge beam 104, 105 near the respective outboard hulls 102, 103 and lower cable bracings 139 are connected from the center hull 101 to the bridge beam 104, 105 near the respective outboard hulls 102, 103. The cable bracings 138, 139 are provided port and starboard, forward and aft on the respective arched members 135 and adjacent bridge beams 104, 105. The cable bracings 138, 139 provide additional support and stability to the port and starboard hulls 102, 103 when the hulls are disposed outwardly in the sailing position.

Figure 13:
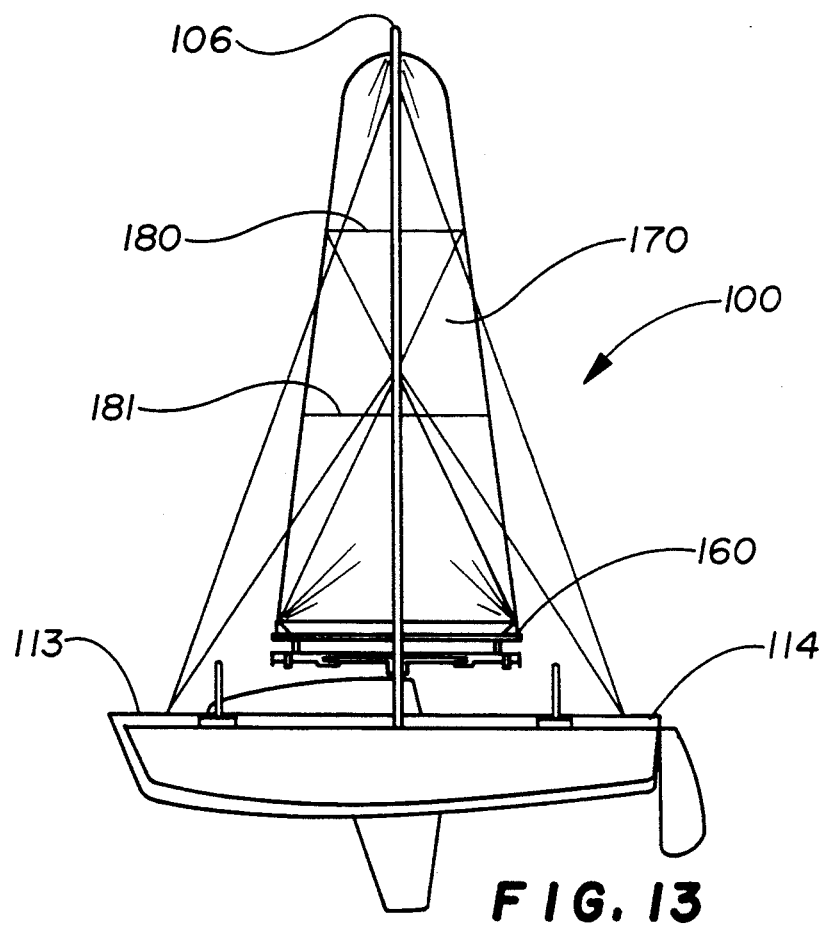
FIG. 13 is a side elevation view of the sailing craft of FIG. 7.
Figure 14:
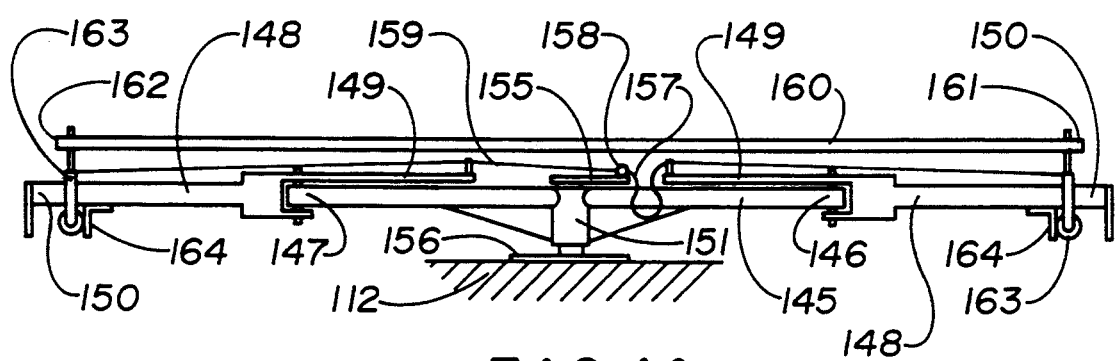
FIG. 14 is an enlarged side elevation view showing the rotating primary boom, the articulating booms and the sail shape boom.

As seen in FIG. 13, primary boom 145 is rotatably mounted on the deck 112 of the center hull 101 approximately amidships and between the port leg 107 and the starboard leg 108 of the mast 106 (when the mast 106 is disposed on the port hull 102 and starboard hull 103). In this manner, the primary boom 145 is approximately centered fore to aft and port to starboard of the sailing craft 100. The primary boom 145 is rotatable through 360° about a rotary axis, the primary boom 145 being in a plane parallel to the longitudinal plane of the center hull 101. As shown in FIG. 14, the primary boom 145 has a first end 146 and an opposite second end 147. A pair of secondary articulating booms 148 are pivotally connected to the respective ends 146, 147 of the primary boom 145. Each articulating boom 148 has a first inward end 149 oriented toward the center of the primary boom 145 and a second opposite outward end 150 oriented away from the center of the primary boom 145.

The primary boom 145 preferably has a center shaft 151 connected perpendicularly to the midpoint of the boom 145 and rotatably connected to the deck 112 of the center hull 101. Preferably, the center shaft 151 is hollow.

Figure 15:
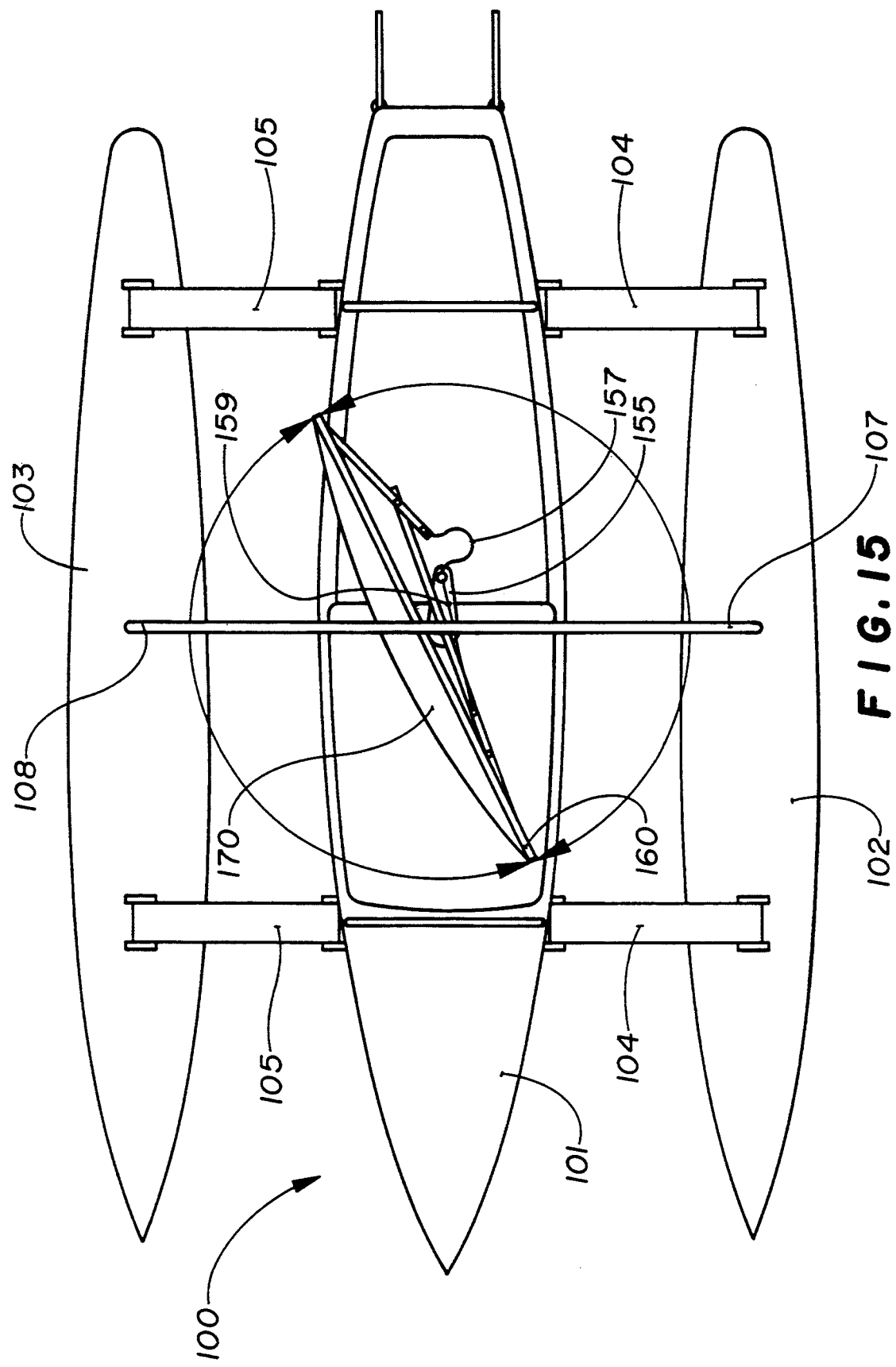
FIG. 15 is a top plan view showing diagrammatically, the rotation of the booms within the mast and articulation of the articulating booms.

A calm 155 has a wider rounded end and an opposite narrower end. The base 156 of the cam 155 is mounted on the deck 112 of the center hull 101. Preferably, the cam 155 has a shaft extending upwardly through the hollow center shaft of the primary boom 145. In this manner, the cam 155 is above the midpoint of the primary boom 145 on the center line of the center hull 101 and the narrower end of the cam 155 is oriented toward the stern 114 of the sailing craft 100. The primary boom 145 may rotate about the cam 155. Referring to FIGS. 14–15, a first line 157 has one end connected to the cam 155 at a juncture point 158. The first line 157 slidably passes through an eye on the inward end 149 of one of the articulating booms 148. The other end of the first line 157 is connected to the outward end 150 of the one of the articulating booms as will be described. A second line 158 has one end connected to the cam 155 at the same juncture point 158. The second line 158 slidably passes through an eye on the inward end 149 of the other articulating boom 148. The other end of the second line is connected to the outward end 150 of the other of the articulating booms 148 as will be described. When the primary boom 145 rotates in a first direction, the first line 157 is tightened becoming the luff and the second line 159 is slackened such that one of the articulating booms is pivoted about the respective end of the primary boom 145. When the primary boom 145 rotates in a second, opposite direction, the second line 159 is tightened becoming the luff and the first line is slackened such that the other articulating boom is pivoted about the respective end of the primary boom 145. In this manner, the forward end and the aft end of the primary boom 145 and of the articulating booms 148 are interchangeable as the booms rotate.

A sail shape boom 160 has a first end 161 and an opposite second end 162. The first end 161 of the sail shape boom 160 is slidably connected to the outward end 150 of one of the articulating booms 148 and the second end 162 of the sail shape boom 160 is slidably connected to the outward end 150 of the other of the articulation booms 148. The connection is by a trolley 163 on each of the articulating booms 148 whereby, as the primary boom 145 rotates and the articulating booms 148 pivot due to the respective other ends of the lines 157, 159 being connected to the respective trolleys 163, the respective trolleys travel laterally along the respective articulating boom 148. In this manner, stress on the sail shape boom 160 is reduced and the articulating booms 148 may pivot while remaining connected to the sail shape boom 160. Further, each articulating boom 148 has a stop means 164 formed between the outward end 150 of the respective boom and the pivotal connecting to the primary boom 145. The stop means 164 limits the inward travel of the respective trolley 163. The stop means 164 may be a protrusion on the surface of the articulating boom or any other means known to persons skilled in the art to prevent continuing lateral travel by the trolley 163.

The sail shape boom 160 is disposed in a longitudinal plane above the longitudinal plane of the rotating primary boom 145 and the articulating boom 148 attached to the primary boom 145. When the primary boom 145 rotates through 360°, the articulating booms 148 and the sail shape boom 160 also rotate through 360°. The ends 161, 162 of the sail shape boom 160 and outward ends 150 of the articulating booms 148 avoid contact with the mast 106.

Figure 16:
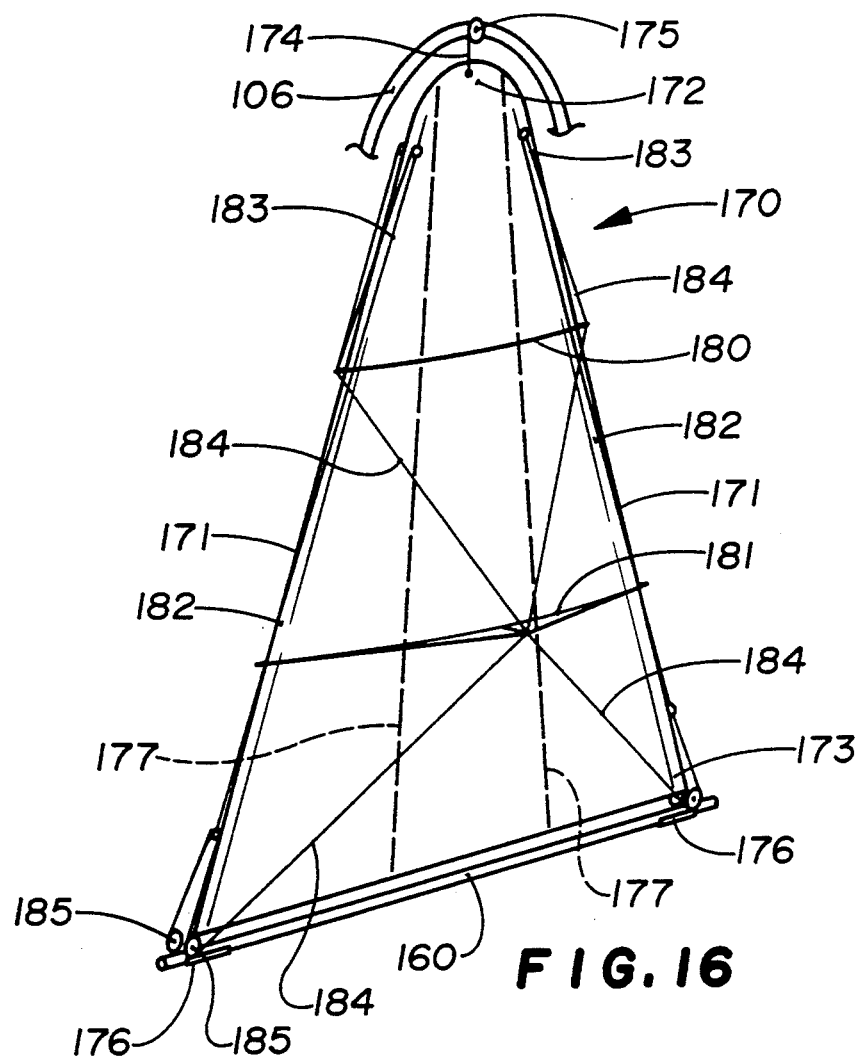
FIG. 16 is a side elevation view of the sail mounted within the mast showing the wishbone spars, the sail lines and the support lines.
Figure 17:
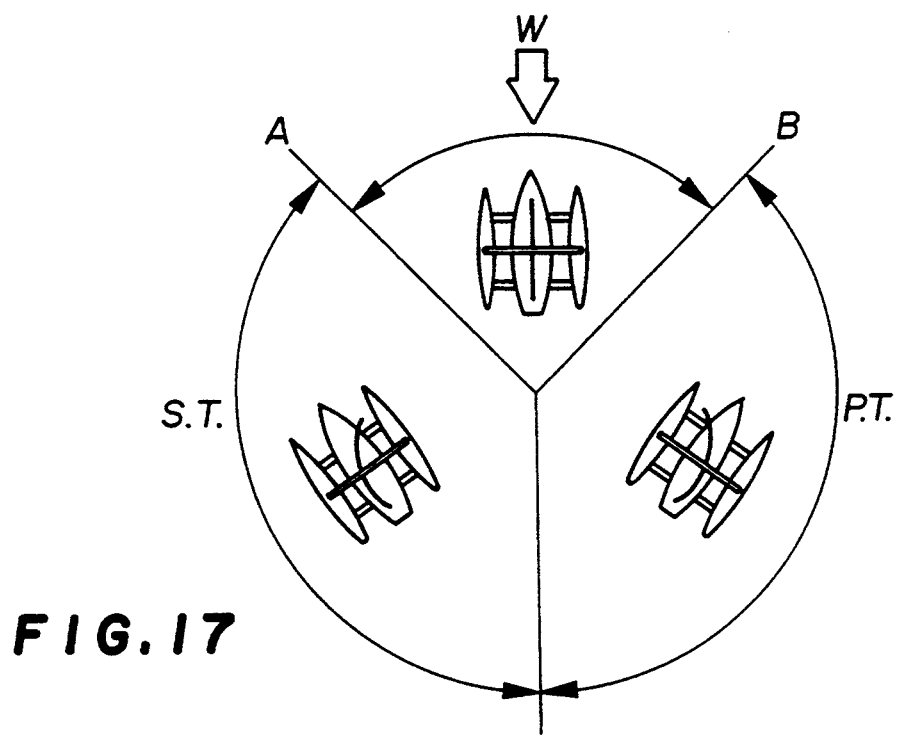
FIG. 17 is a front view of the sail showing the wishbone spars, the sail lines and the support lines.
Figure 18:
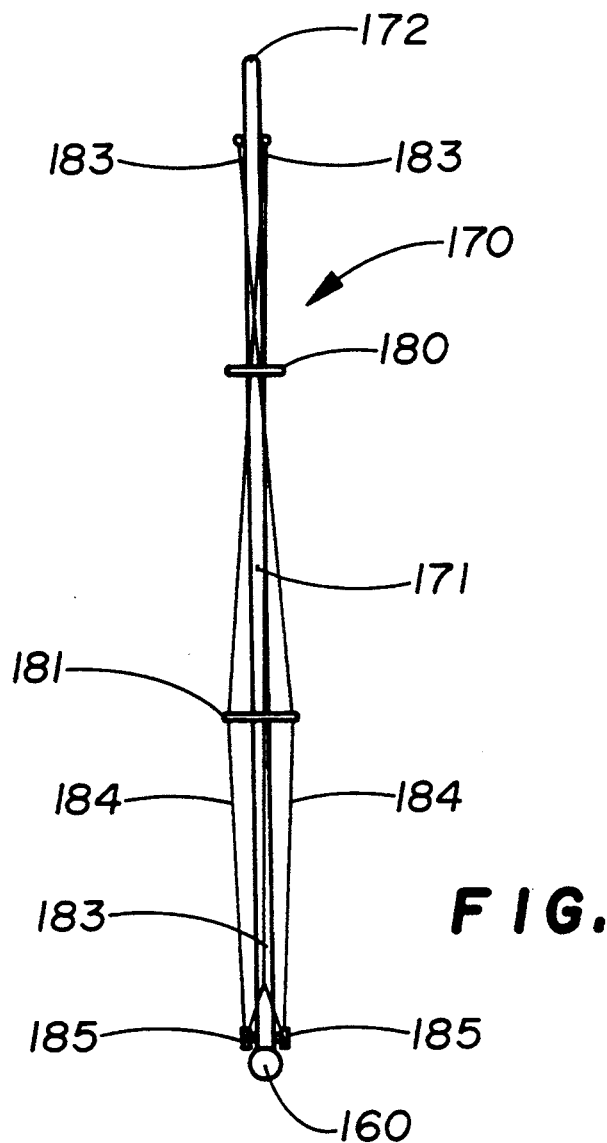
FIG. 18 is a top plan view of the sail showing the wishbone spar, the sail lines and the support lines.
Figure 19:
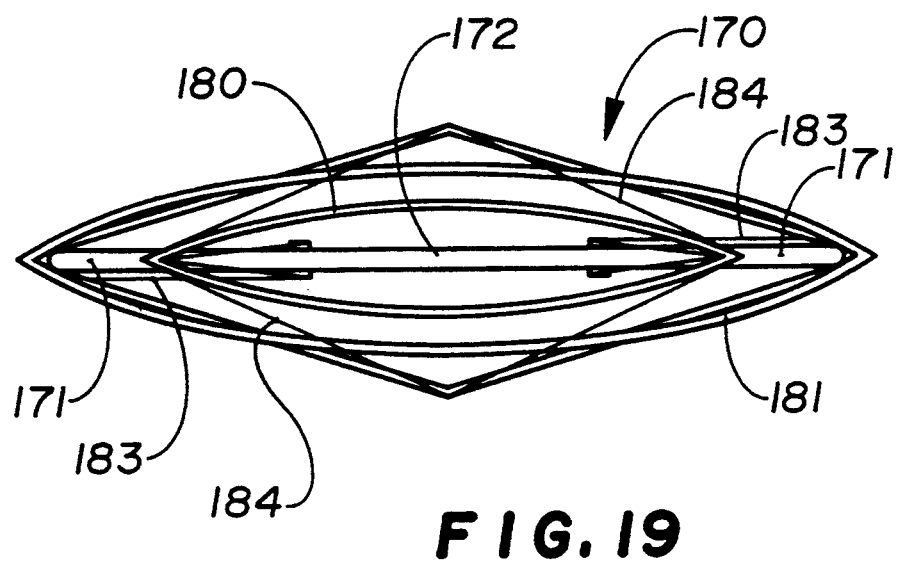
FIG. 19 is a diagram showing sailing of the sailing craft of the present invention with respect to the wind.

Referring to FIG. 16–18, a sail 170 having at least two edges 171, a head 172 and a foot 173 is mounted within the mast 106 and avoiding contact with the mast 106. The sail 170 is symmetrical about a vertical axis. The head 172 of the sail 170 is releasably attached to the top 109 of the mast 106. Preferably a halyard 174 is connected to the head 172 of the sail 170, the halyard 174 passing through a pulley means 175 attached to the top 109 of the mast and continuing along the mast 106 to near the end of one of the legs of the mast where the halyard 174 may be secured to a cleat. Pulling downwardly on the halyard 174 raises the sail 170 and releasing the halyard 174 lowers the sail 170. The amount of tension on the sail 170 can be adjusted by use of the halyard 174 depending upon the intensity of the wind. The foot 172 of the sail 170 is connected to the sail shape boom 160. The corners at the foot of the sail 170 are attached by an outhaul 176 to permit lateral movement for the sail 170. A pair of spaced-apart downhaul lines 177 are connected to the sail 170 and extend from near the head 172 of the sail 170 to the foot 173 of the sail 170. The downhaul lines 177 further are each connected to the sail shape boom 160 and provide additional support for the sail.

An upper wishbone spar 180 is connected laterally to the sail near the head 172 of the sail 170 and a lower wishbone spar 181 is connected laterally to the sail 170 at approximately the center of the sail 170 between the head 172 and the foot 173. A hem 182 is formed on each edge 171 of the sail 170. A separate sail line 183 is connected on each edge 171 of the sail 170 near the head 172 of the sail 170, each sail line 183 passing downwardly through the hem 182 on each respective edge 171 of the sail 170 to a point near the foot 172 of the sail 170. Each sail line 183 exists from the respective hem 182 and is separated into two separate support lines 184, thereby forming four support lines 184. Each support line 184 passes through a respective support pulley 185. Two support pulley 185 are connected to the first end 161 of the sail shape boom 160 and two additional support pulleys 185 are connected to the second end 162 of the sail shape boom 160. Each support line 185, after passing through the respective support pulley 185 is angled upwardly and inwardly over the sail 170 to the lower wishbone spar 181 at a point on approximately the vertical axis of the sail 170. The respective support lines 185 are each slidably connected to the lower wishbone spar 181 and are further angled upwardly and outwardly to a slidable connection to the upper wishbone spar 180 at a point near the respective edge 171 of the sail 170. Each support line 185 is further extended upwardly and is connected to the respective edge 181 of the sail 170 at approximately the point where the respective sail lines 183 are connected to the edge 171 of the sail 170. In this manner, two support lines 185 are disposed over one surface of the sail 170 and two support lines 185 are disposed over the opposite surface of the sail 170. Each support line 185, thus extends from the support pulley 185 to form a triangular shape over a surface of the sail 170 and along a respective edge 171 of the sail 170. In this manner, a total of four triangular shapes are formed. The four triangular configurations, together with the two wishbone spars 180, 181 and the two sail lines 183 maintain the sail 170 so that twisting of the sail 170 is reduced, the luff and leach alignment of the sail 170 is maintained and the shape of the sail 170 is controlled by even tension produced throughout the sail 170 and applied by the halyard 174.

In operation, FIG. 17 when the port hull 102 and the starboard hull 103 are disposed in the outboard position and secured by the bridge beams 104, 105, the sail 170 is mounted within the port to starboard disposition of the legs 107, 108 of the mast 106 and the sail 170 avoids contact with the mast 106. When one of the articulating booms 148 is in the forward position and is on the direct center line (fore to aft) of the sailing craft 100, the other articulating boom 148 articulates enough to allow the sailing craft 100 to tack, close haul, port PT or starboard tacking ST (when the wind is on the port side or starboard side respectively), without any other contact being made with the booms or the sail 170. The luff and the leach of the sail 170 are interchangeable and the sailing craft 100 passes through the wind without stalling the sailing craft 100 by backloading the sail 170 even when sailing into the wind (arrow W). When a sail craft of a conventional design is sailing before the wind (running), the sail is on one side of the craft. To change direction of travel, but still going downwind, the sail must be "flipped" across the boat and reloaded on the other side, thereby "jibing". This places a strain on rigging, masts and passengers. A fast swinging boom has produced many a bump on the head of a passenger and has de-masted many a boat. Sailing craft of conventional designs are unable to sail downwind without jibing between the points A and B shown in FIG. 17. However, due to the structure described herein, the sailing craft of the present invention is able to sail under these wind conditions without having to jibe or stall. The articulating booms limit boom swing while the craft is sailing through the wind while preventing backloading on the sail. The 360° of sail rotation allows the sail to be kept fully loaded through any downwind maneuver without ever needing to jibe.

Several significant advantages are derived from the present invention as compared to conventional systems for sailing crafts. One major advantage is the ease with which a sailor can change the angle of the sail within 360° without handling winches and sheet lines simply by turning the helm sail or sail control ring. Due to this 360° rotation within the masts, the need to jibe is eliminated. This feature permits the sailing craft to turn much more rapidly, thereby saving time in racing events and reducing stress on the masts and sails. The sailing craft has the ability to sail backwards or to have the effect of braking due to its 360° trajectory (or orbit) of the sail. The load on the hull has been placed near the center of gravity, thereby lessening the weather helm.

As a result of the above design, a sailing craft is provided which is sailable by one person from one position amidships. The sailing craft is controlled and turned without stressing the sail and/or mast. The sail can easily be turned to "spill" the wind as desired. No complex, heavy and bulky block and tackle systems are required. The deck area is clear of jib sheet lines and winches when used with a sailboat, pitch, rock, roll and heeling are significantly reduced because the sail is centered on the sailing craft and the load on the edge of the sails is minimized. It is estimated that work required to operate the sailing craft of the present invention, as compared to a conventional sailboat, is reduced by approximately 80%.

The sailing craft 100 of the present invention may have a length of approximately twenty-four feet. The width is approximately twenty-two feet when the outboard hulls are secured outwardly and the width is approximately eight feet when the outboard hulls are moved inwardly for storage, transport and power sailing by an outboard motor. Also radio controlled models of the sailing craft 100 may be made having proportionally reduced length and widths.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A sailing craft having a center hull, the hull having a deck, a port side, a starboard side, a bow and a stern in a longitudinal plane, an amidships between the bow and the stern, the craft comprising:

an outboard port hull and an outboard starboard hull, said hulls being adjustably connected to the center hull by respective port and starboard bridge beams, means for moving and securing said outboard hulls adjacent to the center hull for storage, transport and power sailing with an outboard motor, wherein said hulls are in a substantially vertical and seaworthy position and means for moving and securing said outboard hulls outwardly from the center hull for sailing;

an inverted substantially U-shaped mast having a port leg and a starboard leg, said legs having a juncture at an arcuate top, and when the port hull and the starboard hull are disposed outwardly for sailing, the port leg being connected to the port hull and the starboard leg being connected to the starboard hull;

a primary boom having a first end, an opposite second end and a midpoint, the midpoint of the primary boom being rotatably mounted approximately above the amidships of the center hull and between the port leg and the starboard leg of the mast, wherein the primary boom may rotate through 360° about a rotary axis in a plane parallel to the longitudinal plane of the center hull;

a pair of secondary articulating booms, one pivotally connected to the first end of the primary boom and the other pivotally connected to the second end of the primary boom;

a sail shape boom having a first end and an opposite second end, the first end of the sail shape boom slidably connected to the one articulating boom and the second end of the sail shape boom slidably connected to the other articulating boom, said sail shape boom being disposed in a longitudinal plane above the longitudinal plane of the primary boom, whereby, when the primary boom rotates through 360°, the sail shape boom also rotates through 360°, the ends of the sail shape boom avoiding contact with the mast;

a sail having at least two edges, a head, a center portion and a foot, the sail being symmetrical about a vertical axis, the head of the sail being releasably attached to the top of the mast, the foot of the sail being connected to the sail shape boom, two wishbone spars being connected about the sail, a lower wishbone spar being disposed in approximately the center portion of the sail and an upper wishbone spar being disposed near the head of the sail, the wishbone spars and the edges of the sail avoiding contact with the mast, a hem formed on each edge of the sail, a respective sail line enclosed within each hem, each respective sail line being attached near the head of the sail and extending downwardly within each hem to near the foot of the sail, each respective sail line exiting from the respective hem and forming two separate support lines, each respective support line passing through a respective pulley, two pulleys being attached to the first end of the sail shape boom and two pulleys being attached to the second end of the sail shape boom, each support line being angled upwardly and inwardly over the sail and being slidably connected to the lower wishbone spar, each support line further being angled upwardly and outwardly and being connected to the upper wishbone spar, whereby the respective sail lines and support lines reduce twisting and produce even tension throughout the sail;

a cam having a base mounted on the hull deck, the cam being above the midpoint of the primary boom, the primary boom rotating around the cam, a first line connected from the cam to the one articulating boom, a second line connected from the cam to the other articulating boom, whereby when the primary boom rotates in a first direction, the first line is tightened and the second line is slackened such that the one articulating boom pivots, and when the primary boom rotates in a second opposite direction, the second line is tightened and the first line is slackened such that the second articulating boom pivots, whereby the luff and leach of the sail are interchangeable when the primary boom rotates through 180° and the sailing craft passes through the wind without stalling the sailing craft by backloading the sail.

2. The sailing craft of claim 1, wherein the legs of the mast are removably connected to the respective port hull and starboard hull, whereby when the respective hulls are moved to the storage position, the mast is stepped to a storage position in the longitudinal plane of the center hull and the legs of the mast are substantially parallel to one another and when the port hull and starboard hull are moved to the outward position the mast is in an upright position for sailing.

3. The sailing craft of claim 2, wherein when the port and starboard hulls are disposed for storage and transport and the mast is in the storage position, the sailing craft may be placed on a trailer for transport.

4. The sailing craft of claim 2, the center hull, the port hull and the starboard hull each have a respective top surface, a respective keel with a respective vertical plane therebetween, wherein when the mast is the upright sailing position, the vertical plane of the port hull and vertical plane of the starboard hull are disposed at an acute angle with respect to vertical plane of the center hull, the acute angle being a function of the angular juncture of the legs of the mast.

5. The sailing craft of clam 1, further comprising each articulating boom having an outward end, a trolley mounted on the outward end of each articulating boom, one trolley connected to the respective first end and another trolley connected to the respective second end of the sail shape boom, whereby when the respective articulating booms pivot about the primary boom, the respective trolleys travel laterally on the articulating booms.

6. A sailing craft having a center hull, the hull having a deck, a port side, a starboard side, a bow and a stern in a longitudinal plane, an amidships between the bow and the stern, the craft comprising:

an outboard port hull and an outboard starboard hull, said hulls being adjustably connected to the center hull by respective port and starboard bridge beams;

an inverted substantially U-shaped mast having a port leg and a starboard leg, said legs having a juncture at an arcuate top, and when the port hull and the starboard hull are disposed outwardly for sailing, the port leg being connected to the port hull and the starboard leg being connected to the starboard hull;

a primary boom having a first end, an opposite second end and a midpoint, the midpoint of the primary boom being rotatably mounted approximately above the amidships of the center hull and between the port leg and the starboard leg of the mast, wherein the primary boom may rotate through 360° about a rotary axis in a plane parallel to the longitudinal plane of the center hull;

a pair of secondary articulating booms, one pivotally connected to the first end of the primary boom and the other pivotally connected to the second end of the primary boom;

a sail shape boom having a first end and an opposite second end, the first end of the sail shape boom slidably connected to the one articulating boom and the second end of the sail shape boom slidably connected to the other articulating boom, said sail shape boom being disposed in a longitudinal plane above the longitudinal plane of the primary boom, whereby, when the primary boom rotates through 360°, the sail shape boom also rotates through 360°, the ends of the sail shape boom avoiding contact with the mast;

a sail having at least two edges, a head and a foot, the head of the sail being releasably attached to the top of the mast and the foot of the sail being attached to the sail shape boom;

a cam having a base mounted on the hull deck, the cam being above the midpoint of the primary boom, the primary boom rotating around the cam, a first line connected from the cam to the one articulating boom, a second line connected from the cam to the other articulating boom, whereby when the primary boom rotates in a first direction, the first line is tightened and the second line is slackened such that the one articulating boom pivots, and when the primary boom rotates in a second opposite direction, the second line is tightened and the first line is slackened such that the second articulating boom pivots, whereby the luff and leach of the sail are interchangeable when the primary boom rotates through 180° and the sailing craft passes through the wind without stalling the sailing craft by backloading the sail.

7. The sailing craft of claim 6, further comprising each articulating boom having an outward end, a trolley mounted in the outward end of each articulating boom, one trolley connected to the respective first end and another trolley connected to the respective second end of the sail shape boom, whereby when the respective articulating booms pivot about the primary boom, the respective trolleys travel laterally on the articulating booms.

8. The sailing craft of claim 7, further comprising each articulating boom having a stop means formed thereon between the outward end of said boom and the pivotal connection to the primary boom whereby the travel of the trolley is restricted to movement between the respective stop means and the outward end of the respective articulating boom.

9. A sailing craft having a center hull, the hull having a deck, a port side, a starboard side, a bow and a stern in a longitudinal plane, an amidships between the bow and the stern, the craft comprising:

an outboard port hull and an outboard starboard hull, each hull being a top surface, the top surfaces of said hulls being adjustably hingably connected to the center hull by respective port and starboard bridge beams, and means for moving and securing said outboard hulls adjacent to the respective port and starboard sides of the center hull for storage and transport wherein said hulls are in a substantially vertical and seaworthy position and means for moving and securing said outboard hulls outwardly from the center hull for sailing, further comprising each bridge beam having a first arm having an inboard end and an outboard end and a midpoint therebetween and a second arm having an inboard end and an outboard end, the inboard end of the first arm being hingably connected to the center hull, a first threaded bolt perpendicularly connected near the inboard end of the first arm, the first threaded bolt being oriented outwardly from the center hull, a first opening formed near the outboard end of the first arm, the outboard end of the second arm being hingably connected to the top surface of the respective outboard hull, a second threaded bolt perpendicularly connected near the outboard end of the second arm, the second threaded bolt being oriented outwardly from the respective outboard hull, a second opening formed near the outboard end of the second arm, the inboard end of the second arm being hingably connected to approximately the midpoint of the first arm, whereby when the respective outboard hulls are moved outwardly from the center hull, the first arm of the bridge beam is disposed in the longitudinal plane of the center hull and the second threaded bolt on the second arm is received in the first opening in the outboard end of the first arm, a first cooperating threaded means being removably connected to the second threaded bolt to secure the outboard hull outwardly from the center hull in a seaworthy position, and whereby when the outboard hulls are moved adjacent to the center hull, the inboard end of the first arm hingably folding upright at an angle of approximately 90° with respect to the longitudinal plane of the center hull, the second arm, hingably folding at the inboard end and the outboard end such that the second arm is substantially parallel to the first arm, the first threaded bolt being received in the second opening in the outboard end of the second arm, a second cooperating threaded means being removably connected to the first threaded bolt to secure the outboard hull adjacent to the center hull, the outboard hull being in a substantially vertical position so that the sailing craft may be stored, transported and power sailed with an outboard motor.

10. A sailing craft having a center hull, the hull having a deck, a port side, a starboard side, a bow and a stern in a longitudinal plane, an amidships between the bow and the stern, the craft comprising:

an outboard port hull and an outboard starboard hull, each hull being a top surface, the top surfaces of said hulls being adjustably hingably connected to the center hull by respective port and starboard bridge beams, and means for moving and securing said outboard hulls adjacent to the respective port and starboard sides of the center hull for storage and transport wherein said hulls are in a substantially vertical and seaworthy position and means for moving and securing said outboard hulls outwardly from the center hull for sailing.

a forward port bridge beam and a forward starboard bridge beam said bridge beam being diametrically opposed to another, an aft port bridge beam and an aft starboard bridge beam, said bridge beams being diametrically opposed to one another, a forward arched member having a port end connected to the deck on the port side of the center hull adjacent to the forward port bridge beam, a starboard end of the forward arched member connected to the deck on the starboard side of the center hull adjacent to the forward starboard bridge beam, forward upper cable bracings connected from the forward arched member to the respective forward port and starboard bridge beams, forward lower cable bracings connected from the center hull to the respective forward port and starboard bridge beams; an aft arched member having a port end connected to the deck on the port side of the center hull adjacent to the aft port bridge beam, a starboard end of the aft arched member connected to the deck on the starboard side of the center hull adjacent to the aft starboard bridge beam, aft upper cable bracings connected from the aft arched member to the respective aft port and starboard bridge beams, aft lower cable bracings connected from the center hull to the respective aft port and starboard bridge beams.

11. A sailing craft having a center hull, the hull having a deck, a port side, a starboard side, a bow and a stern in a longitudinal plane, an amidships between the bow and the stern, a top surface and a keel with a vertical plane therebetween, the craft comprising:

an outboard port hull and an outboard starboard hull, each hull having a respective top surface and a respective keel with a respective vertical plane therebetween said outboard hulls being adjustably connected to the center hull by respective port and starboard bridge beams, means for moving and securing said outboard hulls adjacent to the center hull for storage and transport wherein the vertical planes of said outboard hulls are substantially parallel and in a seaworthy position and means for moving and securing said outboard hulls outwardly from the center hull for sailing;

an inverted substantially U-shaped mast having a port leg and a starboard leg, said legs having a juncture at an arcuate top, whereby when the port hull and the starboard hull are moved to the respective outward sailing position, the port leg of the mast may be removably connected to the port hull and the starboard leg of the mast may be removably connected to the starboard hull such that the mast is in an upright position, the legs of the mast forming an acute angle therebetween such that the vertical planes of the port hull and the starboard hull are each disposed at an acute angle with respect to the vertical plane of the center hull;

and when the port hull and the starboard hull are moved to the respective storage position, the legs of the mast are disconnected from the outboard hulls, the mast is stepped to a storage position in the longitudinal plane of the center hull, the port leg and the starboard leg of the mast being substantially parallel to one another.

12. The mast of claim 11, further comprising a float means attached to the top of the mast, such that the sailing craft is prevented from being inverted in the water in the event that the sailing craft capsizes.

13. A sailing craft having a center hull, the hull having a deck, a port side, a starboard side, a bow and a stern in a longitudinal plane, an amidships between the bow and the stern, the craft comprising:

an outboard port hull and an outboard starboard hull, said hulls being adjustably connected to the center hull by respective port and starboard bridge beams;

an inverted substantially U-shaped mast having a port leg and a starboard leg, said legs having a juncture at an arcuate top and when the port hull and the starboard hull are disposed outwardly for sailing, the port leg being connected to the port hull and the starboard leg being connected to the starboard hull;

a sail shape boom having a first end and a second end, the sail shape boom being rotatable connected to the center hull and being rotatable through 360° about a rotary axis in a plane parallel to the longitudinal plane of the center hull, the sail shape boom avoiding contact with the legs of the mast;

a sail having at least two edges, a head, a center portion and a foot, the sail being symmetrical about a vertical axis, the head of the sail being releasably attached to the top of the mast, the foot of the sail being connected to the sail shape boom, two wishbone spars being connected about the sail, a lower wishbone spar being disposed in approximately the center portion of the sail and an upper wishbone spar being disposed near the head of the sail, the wishbone spars and the edges of the sail avoiding contact with the mast, a hem formed on each edge of the sail, a respective sail line enclosed within each hem, each respective sail line being attached near the head of the sail and extending downwardly within each hem to near the foot of the sail, each respective sail line exiting from the respective hem and forming two separate support lines, each respective support line passing through a respective pulley, two pulleys being attached to the first end of the sail shape boom and two pulleys being attached to the second end of the sail shape boom, each support line being angled upwardly and inwardly over the sail and being slidably connected to the lower wishbone spar, each support line further being angled upwardly and outwardly and being connected to the upper wishbone spar, whereby the respective sail lines and support lines reduce twisting and produce even tension throughout the sail.

14. The sailing craft of claim 13, further comprising a halyard connected to the head of the sail and passing through a pulley connected to the top of the mast, the halyard extending downwardly along one of the legs of the mast wherein the sail may be raised and lowered.

15. The sailing craft of claim 13, further comprising at least two spaced-apart downhaul lines connected to the sail and extending from near the head of the sail to the foot of the sail, said downhaul lines providing support to the sail.

16. A sailing craft having a center hull, the hull having a bow and a stern in a longitudinal plane, a top surface and a keel with a vertical plane therebetween, the craft comprising:

an outboard port hull and an outboard starboard hull, each hull having a respective top surface and a respective keel with a respective vertical plane therebetween, said outboard hulls being connected to the center hull by respective port and starboard bridge beams, and a mast having a port leg and a starboard leg, the port leg of the mast being connected to the port hull and the starboard leg of the mast being connected to the starboard hull such that the mast is in an upright position substantially transverse to the longitudinal plane of the center hull, the legs of the mast having a juncture at a top above the center hull and forming an acute angle therebetween such that the vertical planes of the port hull and the starboard hull are each disposed at an acute angle with respect to the vertical plane of the center hull.

17. A sailing craft having a center hull, the hull having a deck, a port side, a starboard side, a bow and a stern in a longitudinal plane, an amidships between the bow and the stern, the craft comprising:

an outboard port hull and an outboard starboard hull, said hulls being connected to the center hull by respective port and starboard bridge beams;

a mast having a port leg and a starboard leg, said legs having a juncture at a top above the center hull, the port leg being connected to the port hull and the starboard leg being connected to the starboard hull;

a primary boom having a first end, an opposite second end and a midpoint, the midpoint of the primary boom being rotatably mounted approximately above the amidships of the center hull and between the port leg and the starboard leg of the mast, wherein the primary boom may rotate through 360° about a rotary axis in a plane parallel to the longitudinal plane of the center hull;

a pair of secondary articulating booms, one pivotally connected to the first end of the primary boom and the other pivotally connected to the second end of the primary boom;

a sail shape boom having a first end and an opposite second end, the first end of the sail shape boom slidably connected to the one articulating boom and the second end of the sail shape boom slidably connected to the other articulating boom, said sail shape boom being disposed in a longitudinal plane above the longitudinal plane of the primary boom, whereby, when the primary boom rotates through 360°, the sail shape boom also rotates through 360°, the ends of the sail shape boom avoiding contact with the mast;

a sail having at least two edges, a head and a foot, the head of the sail being releasably attached to the top of the mast and the foot of the sail being attached to the sail shape boom such that the sail may rotate through 360° avoiding contact with the mast.

18. The sailing craft of claim 17, further comprising:

a cam having a base mounted on the hull deck, the cam being above the midpoint of the primary boom, the primary boom rotating around the cam, a first line connected from the cam to the one articulating boom, a second line connected from the cam to the other articulating boom, whereby when the primary boom rotates in a first direction, the first line is tightened and the second line is slackened such that the one articulating boom pivots, and when the primary boom rotates in a second opposite direction, the second line is tightened and the first line is slackened such that the second articulating boom pivots, whereby the luff and leach of the sail are interchangeable when the primary boom rotates through 180° and the sailing craft passes through the wind without stalling the sailing craft by backloading the sail.

* * * * *